(12) United States Patent
Koren

(10) Patent No.: US 6,782,998 B2
(45) Date of Patent: Aug. 31, 2004

(54) CREDIT CARD HOLDER

(76) Inventor: James A. Koren, 25425 State Hwy. 89, Spartansburg, PA (US) 16434

( * ) Notice: Subject to any disclaimer, the term of this patent is extended or adjusted under 35 U.S.C. 154(b) by 97 days.

(21) Appl. No.: 10/132,790

(22) Filed: Apr. 24, 2002

(65) Prior Publication Data

US 2002/0117243 A1 Aug. 29, 2002

Related U.S. Application Data

(63) Continuation-in-part of application No. 09/593,356, filed on Jun. 12, 2000, now abandoned.

(51) Int. Cl.[7] .............................................. A45C 11/18
(52) U.S. Cl. ......................... 206/39; 206/804; 206/815
(58) Field of Search .......................... 206/39–39.8, 38, 206/449, 804, 815; 150/147; 221/33

(56) References Cited

U.S. PATENT DOCUMENTS

| | | | | |
|---|---|---|---|---|
| 501,279 A | * | 7/1893 | Knight | 206/39 |
| 889,950 A | * | 6/1908 | Morrison | 206/39 |
| 912,905 A | * | 2/1909 | Sims | 206/39.5 |
| 934,220 A | * | 9/1909 | Sayles | 206/39 |
| 4,662,518 A | * | 5/1987 | Chiappetta et al. | 206/449 |
| 4,674,628 A | * | 6/1987 | Prinsloo et al. | 206/38.1 |
| 4,777,693 A | * | 10/1988 | Diba et al. | 15/236.01 |
| 5,183,153 A | * | 2/1993 | Linn | 206/232 |
| 6,009,590 A | * | 1/2000 | Stanford | 15/236.07 |

* cited by examiner

Primary Examiner—Jila M. Mohandesi
(74) Attorney, Agent, or Firm—Richard K Thomson

(57) ABSTRACT

A protective case partially surrounds one or more credit card sized articles permitting the card to flexed to pop them in and out of the protective holder. The holder has a bottom wall, four lateral walls and a plurality of protrusions that extend inwardly over the bottom wall to retain one or more credit card sized articles in the holder. The bottom wall has an elliptical opening in it to permit the user to insert her/his finger to belly out the card(s) to shorten its/their effective length facilitating removal from the holder. The procedure may be reversed to insert the card back in the holder. A scraper may be formed along a lower edge of one end wall to permit frost removal from the vehicle's windshield using the credit card holder of the present invention.

8 Claims, 1 Drawing Sheet

CREDIT CARD HOLDER

This application is a continuation-in-part of U.S. patent application Ser. No. 09/593,356 filed Jun. 12, 2000, now abandoned.

BACKGROUND AND SUMMARY OF THE INVENTION

The present invention is directed to a credit card holder that can carry one or more credit card sized articles. More particularly, the present invention is directed to a credit card holder which can be attached to a key chain and permits the card to be snapped out of the holder by flexing the card.

A variety of carriers for credit cards have been developed. Wallets have plastic jackets and slits that can receive credit cards. Some purses have similar receptacles for credit cards. Most of these receptacles require the card to be slid laterally or axially into the receptacle. Such sliding action can damage the magnetic strip that contains the pertinent information needed for the credit card to operate. Further, some people simply want to carry a card or two and a driver's license without having to tote a purse or wallet.

The credit card holder of the present invention is configured to receive 3 or 4 credit card sized articles and to be attachable to a key chain. The protective holder for at least one article includes a bottom wall with an opening in a central portion thereof, four lateral walls extending upwardly a distance sufficient to accommodate 3 to 4 credit card sized articles (depending on thickness), a plurality of tabs extending inwardly from at least some of said lateral walls, the tabs overlying a portion of the at least one article to retain it in said protective holder. A finger may be inserted into the opening the bottom wall and the center of the card(s) bellied outwardly to shorten the effective length of the card(s) to a dimension sufficiently short to clear the plurality of tabs and allow at least the outermost card to be removed. The holder can accommodate a driver's license and 2 or 3 credit cards. A protrusion on one end of the holder has a hole which can receive a key chain so that the user's valuables may be secured in a single package which can be secured in her/his hand or placed in a pocket or wallet, as s/he may desire. A scraper formed along a lower edge of one end wall allows a user to scrape her/his windshield to remove frost before entering her/his vehicle.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
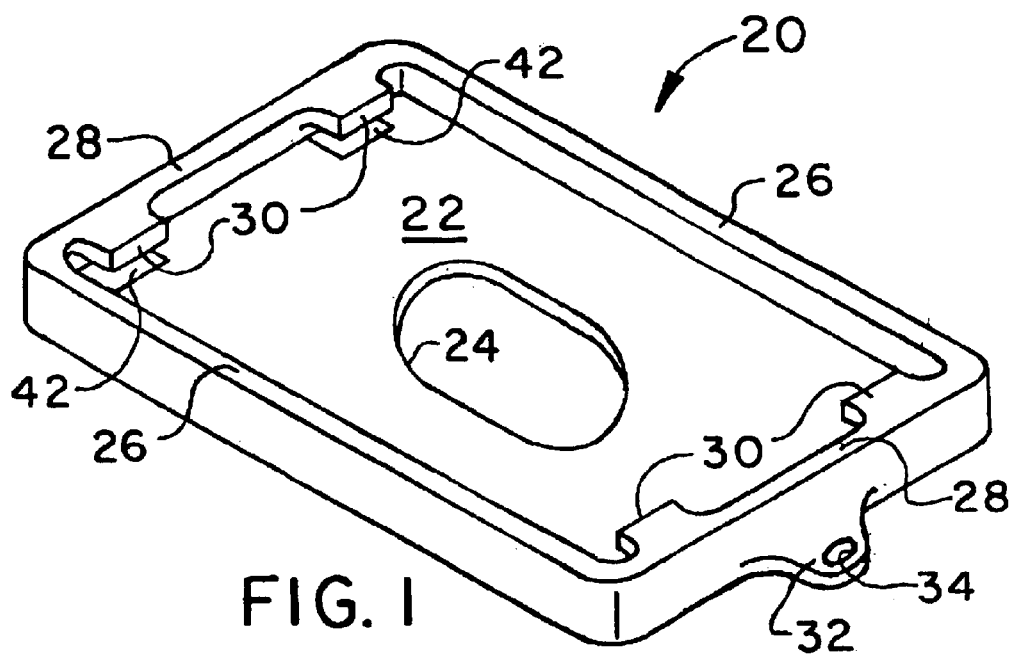
FIG. 1 is a perspective view of a first embodiment of the credit card holder of the present invention.
Figure 2:
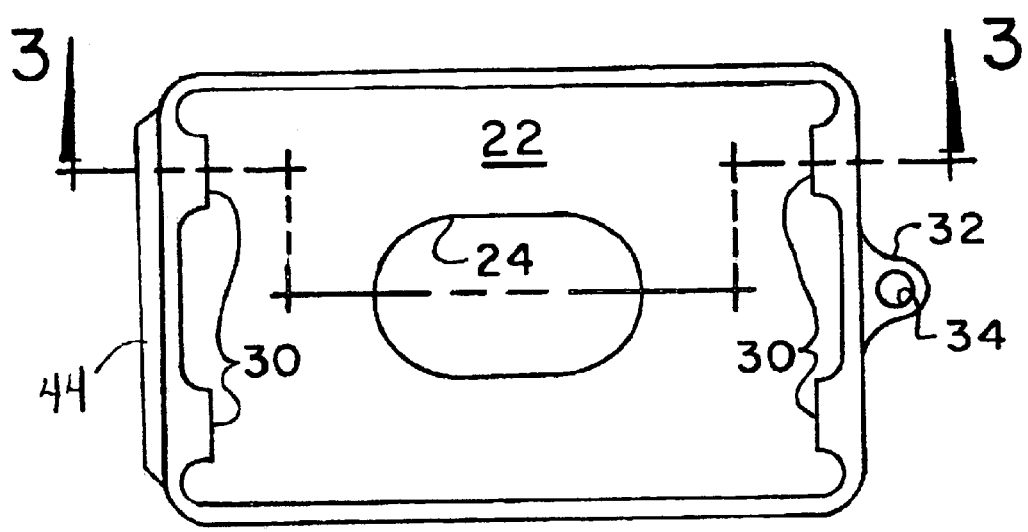
FIG. 2 is a top view of the first embodiment shown in FIG. 1.
Figure 3:
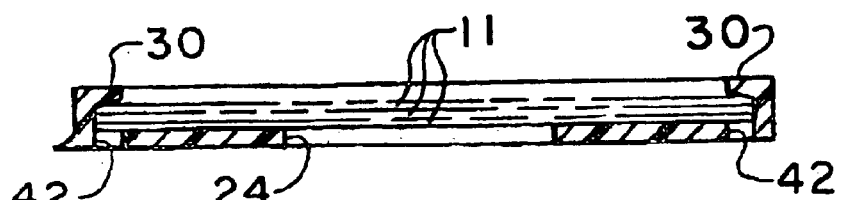
FIG. 3 is a cross-sectional side view as seen on line 3—3 of FIG. 2.

A first preferred embodiment of the credit card holder of the present invention is shown in FIGS. 1–3 generally at 20.

Credit card holder 20 may be made of any suitable material including wood, metal or plastic but, most preferably, is made of a durable, rigid plastic such as polypropylene or, more preferably acrylonitrile-butadiene-styrene (ABS). Credit card holder 20 has a bottom wall 22 with an opening 24 therein. Opening 24 is preferably elliptical to accommodate a woman's long nails. Four lateral walls including two side walls 26 and two end walls 28 extend upwardly a distance sufficient to enable the holder 20 to accommodate 3–4 credit card sized articles. Side walls 26 are separated by a distance only slightly larger than the height of a credit card and the end walls 28 slightly larger than the length of a credit card. A plurality of protrusions 30 extend inwardly from at least some of the lateral walls 26, 28 preferably the end walls 28. A protrusion 32 extends outwardly from one of the end walls 28 and has an opening 34 which allows attachment of a key chain. Four rectangular openings 42 are provided in wall 22 to permit insertion and withdrawal of support pins (not shown) which facilitate the formation of protrusions 30 during the molding process.

The credit card holder 20 of the present invention can be utilized to hold 3–4 credit card sized articles including a driver's license and several credit cards. Alternatively, a driver's license and a credit card could be used to sandwich several bills folded. In this way, a small amount of cash, a driver's license and a couple of credit cards could be carried on a key chain for easy access and the need for a wallet or purse obviated. To remove a card from holder 20, an index finger is inserted through opening 24 to engage a mid-portion of a first face of the lowermost card 11 and the cards 11 bellied outwardly until at least the outermost card 11 has an effective length which is shorter than the distance between opposing protrusions 30 on end walls 28. One or more of the credit cards 11 may then be removed for use and then replaced by essentially reversing the removal procedure when the transaction has been completed, that is, by inserting the first end of the credit card sized article under one set of protrusions 30, flexing the card 11 by pressing one's finger into the back portion through opening 24 or simply by applying longitudinal pressure on the opposite end of the credit card sized article to shorten its effective length to one that is shorter than the distance between opposing protrusions 30 on end walls 28 to permit the second end to be inserted under opposing protrusions 30.

A scraper 44 is formed along one lower edge of one end wall 28, preferably, the edge opposite to the key chain connecting protrusion 32. In this manner, as the user is approaching her/his vehicle and removing her/his key chain from her/his pocket book or pocket, she/he can scrape frost from her/his windshield prior to entering her/his vehicle. This can save time, rather than unlocking the door, fishing around under the seat for the scraper and re-exiting the car to perform the task of scraping the windshield.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A protective holder for at least one credit card sized article, comprising
   a) a bottom wall with a smooth inner surface;
   b) two lateral walls extending upwardly a short distance from said bottom wall and two end walls extending upwardly from said bottom wall, said end walls being interconnected to said two lateral walls to form four edges which extend orthogonally from said bottom wall;

c) a plurality of tabs extending inwardly from said two end walls, said tabs overlying a portion of said bottom wall to retain the at least one article in said protective holder, said two lateral walls having no obstructions positioned above said bottom wall;

d) an opening in said bottom wall, said opening being of a length and width to accommodate a finger of a human hand;

e) a scraper integrally formed with and extending along an edge of one end wall of said protective holder enabling a user to remove frost from her/his windshield prior to entering her/his vehicle;

whereby a finger may be inserted into said opening to engage a mid-portion of a first face of the article to flex it outwardly to decrease its effective length to a dimension which may pass said plurality of tabs and thereby permit removal of the article from said holder.

2. The protective holder of claim 1 wherein said lateral walls and said end walls extend upwardly a sufficient distance to permit said holder to receive a plurality of credit card sized articles.

3. The protective holder of claim 1 wherein said holder is made of a material selected from the group consisting of wood, metal, and plastic.

4. The protective holder of claim 3 wherein said holder is preferably made of plastic material selected from the group consisting of polypropylene and ABS.

5. The protective holder of claim 1 wherein said holder includes means to permit keys to be attached thereto such that said holder becomes a key chain.

6. The protective holder of claim 1 wherein said opening in the bottom wall is elliptical.

7. The protective holder of claim 1 wherein said plurality of tabs include two pairs of tabs which extend inwardly from each of said two end walls.

8. A multi-purpose key chain comprising an article holder including a) a bottom wall with a smooth inner surface;

b) two lateral walls extending upwardly a short distance from said bottom wall and two end walls extending upwardly from said bottom wall, said end walls being interconnected to said two lateral walls to form four edges which extend orthogonally from said bottom wall;

c) a plurality of tabs extending inwardly from said two end walls, said tabs overlying a portion of said bottom wall to retain the at least one article in said protective holder, said two lateral walls having no obstructions positioned above said bottom wall;

d) an opening in said bottom wall, said opening being of a length and width to accommodate a finger of a human hand;

e) a scraper integrally formed with and extending along an edge of one end wall of said multi-purpose key chain enabling a user to remove frost from her/his windshield prior to entering her/his vehicle;

whereby a finger may be inserted into said opening to engage a mid-portion of a first face of an article to flex it outwardly to decrease its effective length to a dimension which may pass said plurality of tabs and thereby permit removal of the article from said holder.

* * * * *